US 8,720,211 B2

(12) United States Patent
Folger

(10) Patent No.: US 8,720,211 B2
(45) Date of Patent: May 13, 2014

(54) DEVICES AND METHODS FOR PRODUCING ICE BEADS FROM AN AQUEOUS MIXTURE

(76) Inventor: Wolfgang Folger, Hockenheim (DE)

( * ) Notice: Subject to any disclaimer, the term of this patent is extended or adjusted under 35 U.S.C. 154(b) by 231 days.

(21) Appl. No.: 13/203,306

(22) PCT Filed: Feb. 25, 2010

(86) PCT No.: PCT/EP2010/001161
§ 371 (c)(1),
(2), (4) Date: Oct. 31, 2011

(87) PCT Pub. No.: WO2010/099893
PCT Pub. Date: Sep. 10, 2010

(65) Prior Publication Data
US 2012/0036871 A1    Feb. 16, 2012

(30) Foreign Application Priority Data
Mar. 6, 2009 (DE) .......................... 10 2009 011 521

(51) Int. Cl.
*F25D 25/00*    (2006.01)
(52) U.S. Cl.
USPC ................................. 62/62; 62/340
(58) Field of Classification Search
CPC ............ F25C 1/00; F25C 24/00; F25D 25/00; F25B 7/00
USPC ................................. 62/66, 62, 340, 347, 430
See application file for complete search history.

(56) References Cited

U.S. PATENT DOCUMENTS 2,751,762 A    6/1956 Colton
3,344,617 A    10/1967 Rinfret et al.
(Continued)

FOREIGN PATENT DOCUMENTS

DE    196 54 652 C1    1/1998
DE    100 12 550 A1    9/2001
(Continued)

OTHER PUBLICATIONS

English translation of International Preliminary Report on Patentability, PCT/EP2010/001161, Sep. 20, 2011, 8 pgs.
(Continued)

*Primary Examiner* — Mohammad M Ali
(74) *Attorney, Agent, or Firm* — Paul D. Strain, Esq.; Strain & Strain PLLC

(57) ABSTRACT

The present invention relates to a device (1) for producing ice beads (10). The device (1) comprises at least one cooling device (18) for cooling a hydrophobic liquid (20) to a temperature of at least −5° C. and a receiving vessel (2, 102) having the hydrophobic liquid (20). Furthermore, the device (1) comprises a pipetting device (3) situated on the receiving vessel (2, 102), which comprises a vessel (4) for an aqueous mixture (11). A plurality of tapering outlet tubes (5) extends therefrom, which is situated in a vessel wall (4'), into the receiving vessel (2, 102). An outlet end of an outlet tube (5) is situated spaced apart in the range of 3 cm to 10 cm from a surface (20') of the hydrophobic liquid (20). Furthermore, the device (1) comprises at least one apparatus for providing a relative velocity between the pipetting device (3) and the hydrophobic liquid (20). The aqueous mixture (11) covers a fluid path (a) from the vessel (4) of the pipetting device (3) via the outlet tubes (5) into the hydrophobic liquid (20) and forms ice beads (10) therein. Furthermore, the present invention provides a method for producing ice beads (10) using the device (1) and discloses ice beads (10) which are producible by the method.

15 Claims, 12 Drawing Sheets

(56) References Cited

U.S. PATENT DOCUMENTS

| | | | | |
|---|---|---|---|---|
| 4,062,799 | A | * | 12/1977 | Matsukawa et al. ............ 264/4.3 |
| 5,219,383 | A | * | 6/1993 | Minari et al. .................... 62/347 |
| 5,501,870 | A | * | 3/1996 | Shiraishi et al. .................. 427/8 |
| 5,664,422 | A | | 9/1997 | Jones |
| 5,687,576 | A | * | 11/1997 | Moriguchi et al. ............... 62/56 |
| 6,474,100 | B1 | * | 11/2002 | Smith et al. .................... 62/480 |
| 6,902,675 | B2 | * | 6/2005 | Kelly et al. .................... 210/634 |
| 7,271,895 | B2 | * | 9/2007 | Khamizov et al. ............ 356/246 |
| 7,678,302 | B2 | * | 3/2010 | Cheng et al. ....................... 264/5 |
| 7,920,317 | B2 | * | 4/2011 | Lee et al. ....................... 359/253 |
| 2002/0070123 | A1 | * | 6/2002 | Andrews et al. ............. 205/626 |
| 2003/0153059 | A1 | * | 8/2003 | Pilkington et al. ........... 435/161 |
| 2008/0011466 | A1 | * | 1/2008 | Albers et al. .................. 165/185 |

FOREIGN PATENT DOCUMENTS

| | | |
|---|---|---|
| DE | 100 12 551 A1 | 9/2001 |
| EP | 0 081 913 A1 | 6/1983 |
| EP | 0 225 081 A1 | 6/1987 |
| EP | 1 160 006 A1 | 12/2001 |
| FR | 2 630 668 A1 | 11/1989 |
| WO | WO 98/03828 A1 | 1/1998 |
| WO | WO 03/039730 A1 | 5/2003 |

OTHER PUBLICATIONS

German Office Action, Application No. 10 2009 011 521.8, Sep. 17, 2009, 6 pgs.

International Search Report, PCT/EP2010/001161, Sep. 9, 2010, 3 pgs.

* cited by examiner

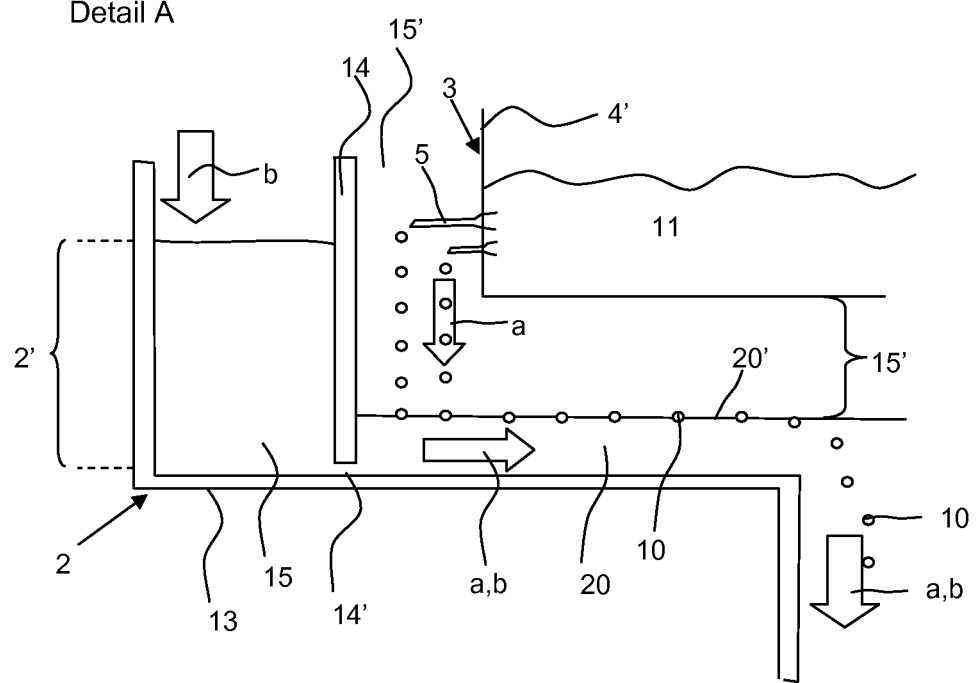

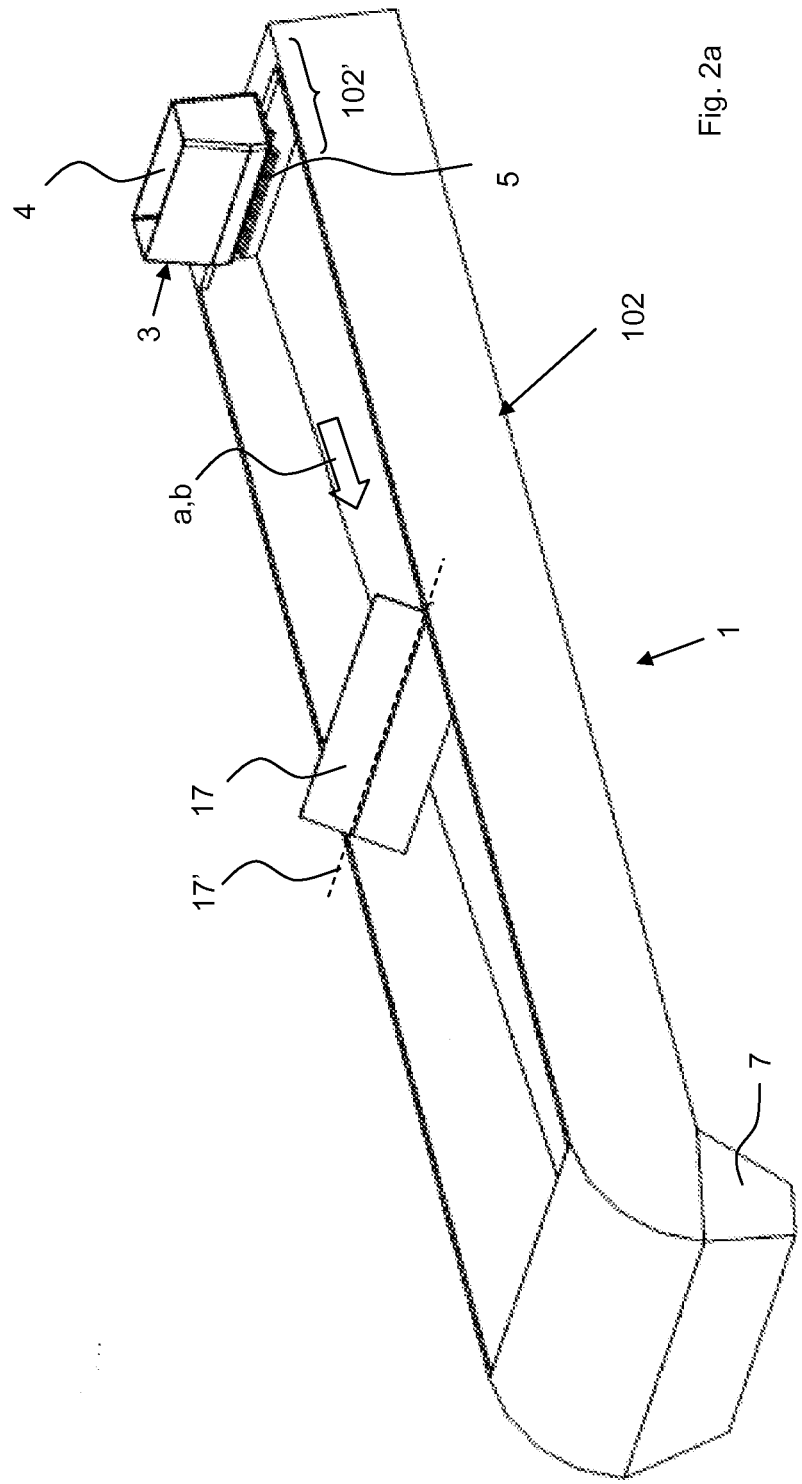

DEVICES AND METHODS FOR PRODUCING ICE BEADS FROM AN AQUEOUS MIXTURE

CROSS-REFERENCE TO RELATED PATENT APPLICATIONS

This application is a National Stage of International Application No. PCT/EP2010/001161. filed Feb. 25, 2010, which is based upon and claims the benefit of priority from prior German Patent Application No. 10 2009 011 521.8, filed Mar. 6, 2009, the entire contents of all of which are incorporated herein by reference in their entirety.

The present invention relates to devices and to a method executable by means of these devices for producing ice beads from an aqueous mixture, in particular ice beads containing active ingredients, and to the ice beads themselves.

The object of the present invention is, on the one hand, substances which are to be dispensed as active ingredients, such as insecticides or herbicides, in large areas of the environment and which are to be applied from the air onto the soil or water surfaces for ideal distribution. In order that the active ingredients can be dispensed suitably and can be applied from the air in a targeted manner to the destination, applying the active ingredient to a carrier medium, which can be distributed accordingly, is known. The generation of ice beads from the carrier medium having the active ingredient has proven to be suitable to achieve this purpose.

The production of ice beads has heretofore been performed employing liquid nitrogen, which is a costly production method, since large components of the liquid nitrogen used escape solely because of the significant temperature gradient to the ambient temperature and in particular during the execution of the method because of the temperature increase occurring due to the introduction of the liquid to be frozen, and therefore large quantities of liquid nitrogen are required for performing the method. The genesis of the nitrogen requires substantial quantities of energy, so that the actual computable energy requirement for freezing a carrier medium-active ingredient mixture, which can often be a water/active ingredient mixture, is substantially exceeded by the actual energy requirement.

In addition, the use of liquid nitrogen results in the very rapid freezing of the ice and therefore the conglomeration of the ice balls or to the occurrence of imperfect particles, for example, particles which are hollow or not ideally shaped in another way, as well as unsatisfactory grain size distribution, which accordingly makes the homogeneous dispensing of the ice particles more difficult. An improvement of the ice quality employing the known method using the freezing agent nitrogen could be achieved by a drastic reduction of the rejection rate with simultaneous nitrogen supply to the facility, which is unfavorable in particular in consideration of the cost increase connected thereto and because of the unsatisfactory production rate.

Furthermore, handling liquid nitrogen has certain hazards and therefore requires the application of complex safety measures, the employment of appropriately trained personnel, and the preparation of complex devices for the method.

Proceeding from this prior art, it would be desirable to provide a simple device, which is safe to handle, for the generation of ice beads, which is capable of providing a method, which is uncomplicated to perform and is suitable from safety aspects, it in turn being desirable to be able to manufacture ice beads for various application purposes.

This object is achieved by a device for producing ice beads containing active ingredient having the features of Claim 1 and further by a corresponding method having the features of Claim 12. Furthermore, an ice bead product having the features of Claim 14 is disclosed. Refinements of the device, the method, and the ice bead product are set forth in the subclaims.

An embodiment of the device according to the invention for producing the ice beads from an aqueous mixture comprises a device having a cooling device, which is capable of cooling down a hydrophobic liquid to a temperature which allows the freezing of the material to be introduced in the desired time and to a desired degree, as well as a receiving vessel for the cooled hydrophobic liquid, as well as a pipetting device situated on the receiving vessel. This pipetting device essentially comprises a vessel for the aqueous mixture, which is to be frozen into beads; for this purpose, it has outlet tubes in a side wall or in the floor, via which the aqueous mixture is dripped into the hydrophobic liquid: The dripping is achieved in that the pipetting device is situated protruding sufficiently far into the receiving vessel—for example, by means of a mount—that the ends of the outlet tubes end in the range of 10 cm above a surface of the hydrophobic liquid or are immersed up to 0.5 cm deep therein.

The device is composed or has an additional device so that either the hydrophobic liquid flows and entrains dripping droplets, or the pipetting device is moved in relation to the container or, vice versa, the container having the hydrophobic liquid is moved under the pipetting device, so that the droplets tear off from the end of the outlet tube and fall into the resting cold fluid. An ideal droplet shape is obtained if the dripping liquid, which is thus driven out of the outlet tubes at least because of the hydrostatic pressure, falls into the cryogenic hydrophobic liquid, whereby ideally shaped ice beads can be obtained, which are frozen through uniformly, when they have covered a predefined flowing or sinking route in the hydrophobic liquid.

It can be sufficient for the hydrophobic liquid to have a temperature of slightly below 0° C. for freezing aqueous mixtures, lower temperatures of the hydrophobic medium can advantageously be selected to achieve an improved production rate.

The pipetting device can be composed of a casting, for example, of metal or plastic, it is also possible to provide arbitrary suitable vessels with a plurality of passage openings and fit cannulas therein.

The product, which is ideally suitable for dispensing active ingredients from the air, can be received in a large mass of frozen solid, dimensionally stable ice beads in corresponding insulated containers and distributed from the air by means of corresponding scattering devices.

Depending on the composition of the hydrophobic liquid with respect to its viscosity in the corresponding temperature range, for example, it may be a petroleum fraction such as kerosene and petroleum, or a vegetable oil, which is also suitable for dispensing in agricultural or fishery areas in a way which is harmless from a toxicological aspect, such as false flax oil, flax oil, or rapeseed oil. All oils can be used in the mixture, rapeseed oil only being able applied suitably in a mixture with other oils, such as the above-mentioned oils. It is decisive that the liquid can assume a sufficiently low temperature in order to freeze through an aqueous active ingredient mixture continuously, without assuming a viscosity due to excessively low temperatures, which prevents the formation of the ball shape of the introduced liquid to be frozen, or which causes the freezing procedure to already progress sufficiently far before the ball shape is formed that irregular ice results.

In the present case, an active ingredient which is provided dissolved in water, emulsified, or in the form of floating particles in the water, which acts as an insecticide, herbicide, fungicide, fertilizer, soil improvement agent, and/or water improvement agent is suitable as the liquid to be frozen into ice beads. Known insecticides which come into consideration for this purpose are BTI or BS endotoxin.

The cooling device will be connected to the receiving vessel for the active ingredient mixture by means of a pump. The vessel in which the hydrophobic liquid is contained has a receiving section, via which it is filled, and correspondingly an outlet section, in which a retrieval device is provided, which is advantageously used for the purpose of discharging the hydrophobic liquid and ice beads. It is possible to provide an outlet opening in a simple way, so that the product drains out with the hydrophobic liquid, but it is also possible to suction off the resulting ice beads using a corresponding suction pump or to scoop them out using a scooper.

In order to separate the ice beads from the hydrophobic liquid, a simple mechanical separation device, such as a sieve or a centrifuge or a combination of both technologies can be provided, the excess hydrophobic liquid advantageously being able to be retrieved and transferred back into the device after corresponding cooling. The method usable with the device described in the present case therefore proves to be very favorable from an economic aspect, since little loss of cooling liquid occurs.

As described above, the hydrophobic liquid is to move so it flows away in relation to the stationary outlet tubes or cannula tips, or a relative velocity is provided between the hydrophobic liquid and the cannula tips or outlet tubes, in that either the cannula tips or outlet tubes or the container having the resting hydrophobic liquid are moved. In all cases, the relative movement ensures that the droplets of the liquid to be frozen enter the hydrophobic liquid separately and a unification of droplets to form larger formations is prevented, and the droplets freeze into individual ice beads.

If the cannula tips are immersed in the hydrophobic liquid, inter alia, the relative velocity of the hydrophobic liquid to the cannula tips influences the diameter of the generated ice beads.

In the case of the drip device situated freely over the liquid, the cannula diameter, the hydrostatic pressure, and the size and formation of the tear-off surface at the cannula tips decide the diameter of the droplets. The droplet assumes the spherical shape itself by natural law as a function of the surface tension, if it is not prevented therefrom, for example, by an excessively high viscosity of the hydrophobic liquid or by excessively large shear forces in proximity to the container walls in the case of a moving hydrophobic fluid.

The relative movement of the two reaction substances can advantageously be achieved by two fundamentally different reactor types:

One reactor essentially comprises a vertically oriented flow tube, which can advantageously be insulated or which is cooled by means of a cooling device.

A second reactor form provides the design as a flow channel. The flow channel can have an inclination along its main extension direction. The orientation of the vertical flow reactor or the inclined flow channel already causes the hydrophobic liquid to flow; the corresponding means for accelerating the hydrophobic liquid are to be seen in the throughput quantity in the case of the vertical flow reactor, in the case of the flow channel, at a given throughput quantity, the inclination of the channel decides the thickness of the flow cross-section of the hydrophobic liquid in the channel, and therefore the flow velocity.

An advantageous form of the supply of the hydrophobic liquid into a reactor having a vertically oriented flow tube can be implemented via a distributor device, into which the supply device for the cooled hydrophobic liquid opens. This distributor device extends horizontally in the receiving section in the area of the surface of the hydrophobic liquid formed in the flow tube. A hollow profile can be selected as the distributor device, which is not closed along a length of one side—the "upper side"—and thus has a slotted exit opening for the hydrophobic liquid. The hollow profile floats on its lower, closed surface in the hydrophobic liquid, which has a fill level which is slightly below the level of the exit slot, so that the liquid flows down from the exit slot to the liquid surface. If the side walls of the hollow profile are advantageously curved rounded toward the exit slot, the liquid can flow slowly over the rounded shoulder before it passes into the vertical flow section in the flow tube.

The slotted exit opening advantageously runs below the pipetting device, it being advantageous for it to have two rows of outlet tubes running in parallel, which each extend downward to one of the sections adjacent to the exit slot. Correspondingly, the ice beads formed from the droplets of the respective outlet tube row are guided on both sides past the hollow profile with the flow of the hydrophobic liquid into the flow section and from there into the outlet section.

Furthermore, in the case of the vertically situated flow reactor, it is possible to provide the pipetting device directly in an upper section, which is used as the receiving section for the hydrophobic fluid to be supplied. In a flow reactor having circular cross-section, a shoulder can be provided in this case on the upper end of the tube, which results in a transition to a widened tube section as the receiving section. This is also fundamentally possible in reactors having polygonal cross-sections. The pipetting device can now be introduced into this widened tube section, the pipetting device being adapted with respect to its external contour to the contour of the receiving section of the flow channel.

A pipetting device also having cylindrical shape can be inserted accordingly into a cylindrical flow reactor of an alternative embodiment of the invention, whose tube cross-section widens suddenly on its receiving section. The cannulas can be inserted into the wall of the cylindrical vessel so that they are essentially transverse to the longitudinal axis of the flow reactor. It is possible to provide multiple rows of cannulas peripherally and one over another, staggered appropriately, on the wall of the pipetting device vessel.

The wall of the cylindrical vessel which contains the aqueous active ingredient mixture is spaced apart from the outer wall of the flow reactor far enough that a ring can be situated around the cylindrical water/active ingredient vessel as a separation ring. The ring is supported on the shoulder of the flow reactor, however, a ring gap remaining. The cryogenic hydrophobic fluid can now be decanted between the wall of the separation ring and the outer wall into the resulting decanting space of the flow reactor, and it flows along the shoulder below the ring gap, until it drains in the direction of the retrieval device at the tapered section of the flow reactor.

The pipetting device inserted into the receiving section of the flow reactor is supported sufficiently via the folder using its base, optionally by spacers, in any case enough via the shoulder, that hydrophobic fluid flowing through under the ring gap can flow down unobstructed to the vessel having the water/active ingredient mixture. The essentially horizontally oriented cannula tips therefore allow the water/active ingredient mixture exiting from the cannula tips to first fall a route of approximately 3 to 7 cm in the air gap, before it impinges on the oil. The air gap is provided between the outer wall of the cylindrical vessel and the ring-shaped separating insert.

The droplets impinging on the hydrophobic fluid stream, which can be an oil stream, leave the flow reactor, which can advantageously taper in the form of a funnel at its lower end, through an outlet nozzle. The stream containing the ice beads is subjected to further treatment therefrom.

Further embodiments provide that a separation device for separating the ice bead products from the hydrophobic liquid is attached directly to the removal device. The embodiment of the device according to the invention implemented as a flow channel can have a linear shape or a ring shape. The linear shape can be designed as a simple channel which is open on top, but it can also be designed as a belt conveyor.

The flow channel can also be insulated accordingly or its wall can be coupled to a cooling device for economic reasons. Through a corresponding inclination of the flow channel, a flow of the hydrophobic liquid and therefore the desired relative velocity between hydrophobic liquid and cannula tips is also already achieved here. Ice-cold hydrophobic liquid is applied to the flow channel at one end, at which the pipetting device is also situated. At its other end, the flow channel has an outlet opening, which can correspondingly be connected to a separation device, such as a centrifuge or a sieve. Because of this embodiment, the hydrophobic medium separated in the separation device can be retrieved and returned back into the process after appropriate cooling.

A plate which is rotatable around its longitudinal axis can advantageously be situated as a damming device in the fluid path between the pipetting device and the outlet device. This rotatable plate causes the incoming water/active ingredient mixture droplets, which are freezing, to be submerged below the surface of the hydrophobic liquid. The droplets do not touch the plate because of the hydrodynamic effects and are not damaged, however, the further freezing through is promoted by the guiding down to a greater depth of the hydrophobic liquid.

The method executable using the embodiments of the device according to the invention fundamentally provides that a hydrophobic liquid is cooled by means of a corresponding cooling device to a temperature which is suitable as a function of the properties of the selected hydrophobic liquid and the liquid to be frozen as well as the desired processing time, but which is below 0° C. in any case, before it is poured into the receiving vessel, which can accordingly be a flow reactor or a flow channel. The energy expenditure required for cooling the hydrophobic liquid is low, compared to the energy expenditure for the provision of nitrogen for methods for producing similar products.

In parallel thereto, the aqueous active ingredient mixture is put into the pipetting vessel, since the cannulas are not blocked, the aqueous active ingredient mixtures being able to be transferred drop-by-drop via the cannulas into the hydrophobic liquid solely through the effect of gravity. The dripping speed may be determined via the exit opening and/or the hydrostatic pressure.

Depending on the configuration of the cannula tips above the surface of the hydrophobic liquid or below the surface thereof, the droplets cover a falling distance in the air. As soon as the droplets touch the liquid, they begin to freeze and begin to float on the surface of the hydrophobic medium, since the specific density can be very close to that of the freezing material depending on the temperature of the hydrophobic medium.

In the case of non-immersed cannulas, in the horizontally oriented reactors, the droplets remain resting on the cold hydrophobic medium and initially only freeze on their lower side. In an embodiment of the device which provides a rotatably mounted plate, they are advantageously forced under the surface, while in contrast in a vertically oriented flow tube, a suction, which arises due to the continuous through flow of the reactor, pulls the droplets downward with it, so that further freezing occurs. After a corresponding flow route is covered, the formation of a bead-shaped ice product from the aqueous active ingredient mixture is completed. Spherical frozen droplets then leave the reactor together with the hydrophobic medium, or with the oil, respectively, through the outlet opening.

The mixture made of hydrophobic liquid and the ice beads can now be removed, in that either draining from the channel or the flow reactor is performed, or in that scooping or suctioning is performed using corresponding devices, which only relates to the flow channel, which can also be implemented as ring-shaped.

The separated ice beads can be supplied to their use, while the separated excess hydrophobic liquid can be cooled down to processing temperature again and supplied to the receiving vessel at the receiving section.

The resulting ice bead products are advantageously spherical, homogenously frozen through, and may be set with respect to their size as a function of the cannula internal diameter.

The devices according to the invention for producing the ice beads can provide a flow of the hydrophobic liquid by corresponding provision of an inclination of the receiving vessels, however, it is also possible that the container for the hydrophobic liquid is operatively coupled to drive means, so that the container itself can be put into motion, moved past below the pipetting device, whereby the droplets exiting from the cannulas are caused to drip individually into the hydrophobic liquid and freeze. Shear forces in the area of the container walls can advantageously be avoided by the resting liquid, and droplets may be applied to the entire width of the container.

The reference to the figures in the description serves to support the description. The figures are solely schematic illustrations of exemplary embodiments of the invention. In the figures:

FIG. 1b shows a perspective longitudinal section of the reactor from FIG. 1a,

Figure 1A:
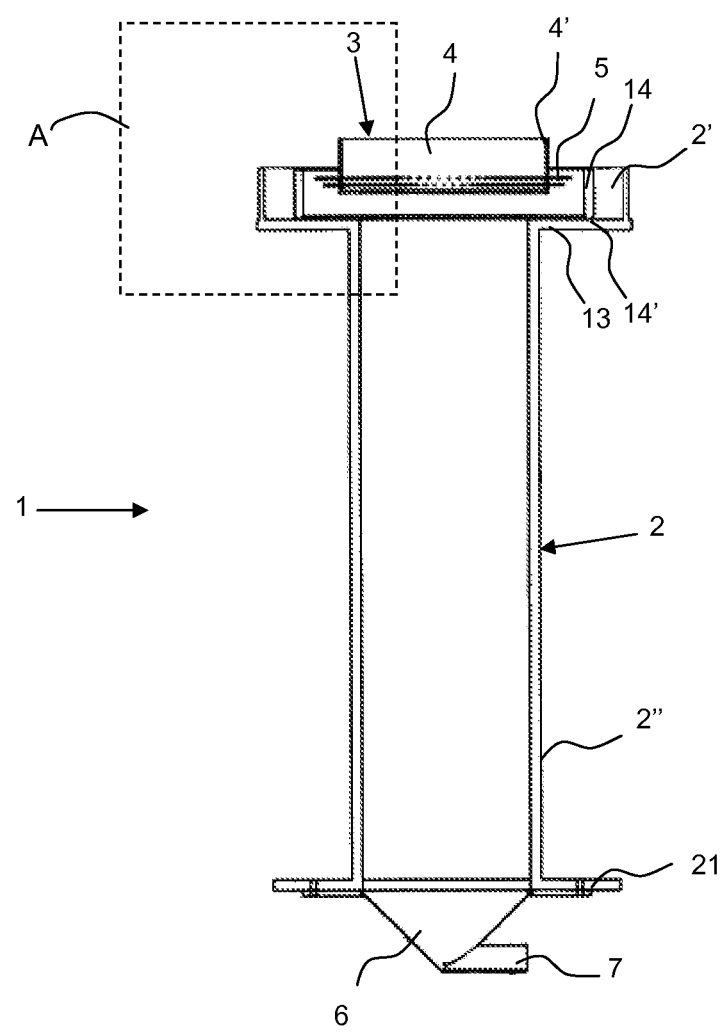
FIG. 1a shows a frontal longitudinal section of a vertical flow reactor
Figure 2B:
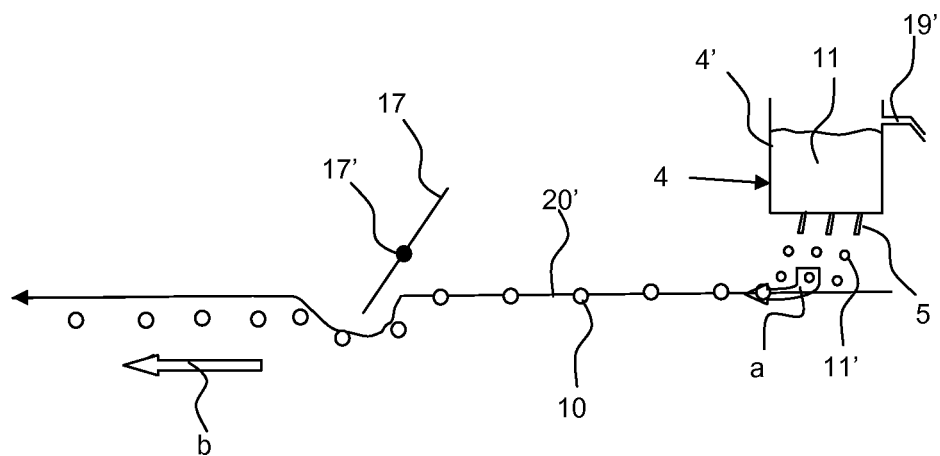
Figure 3:
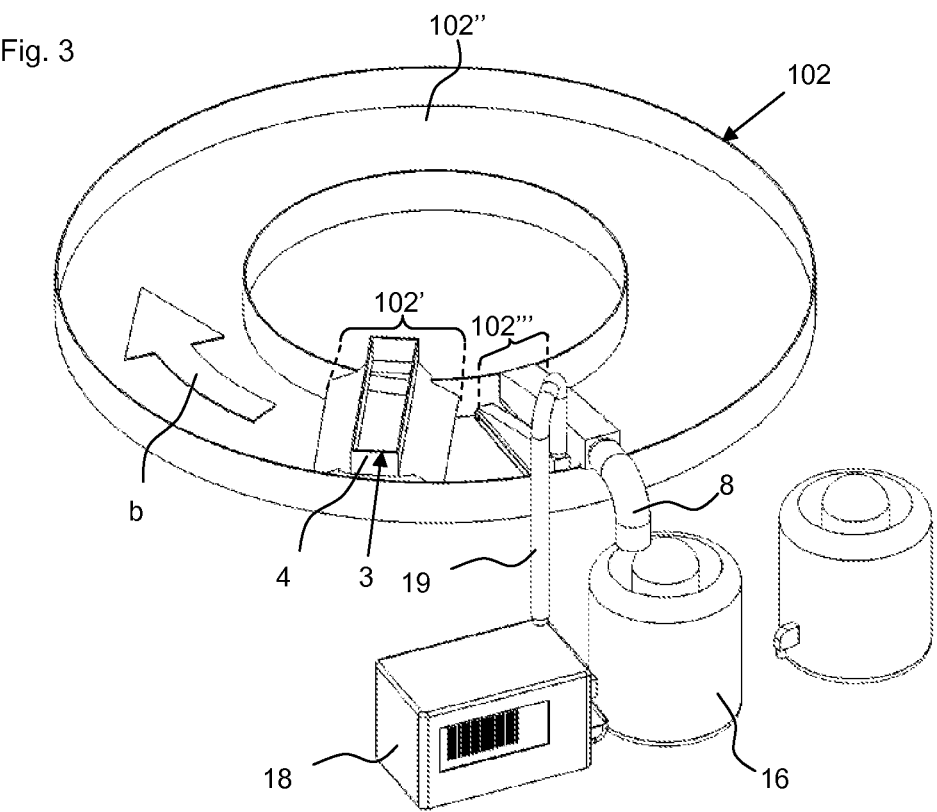
Figure 4:
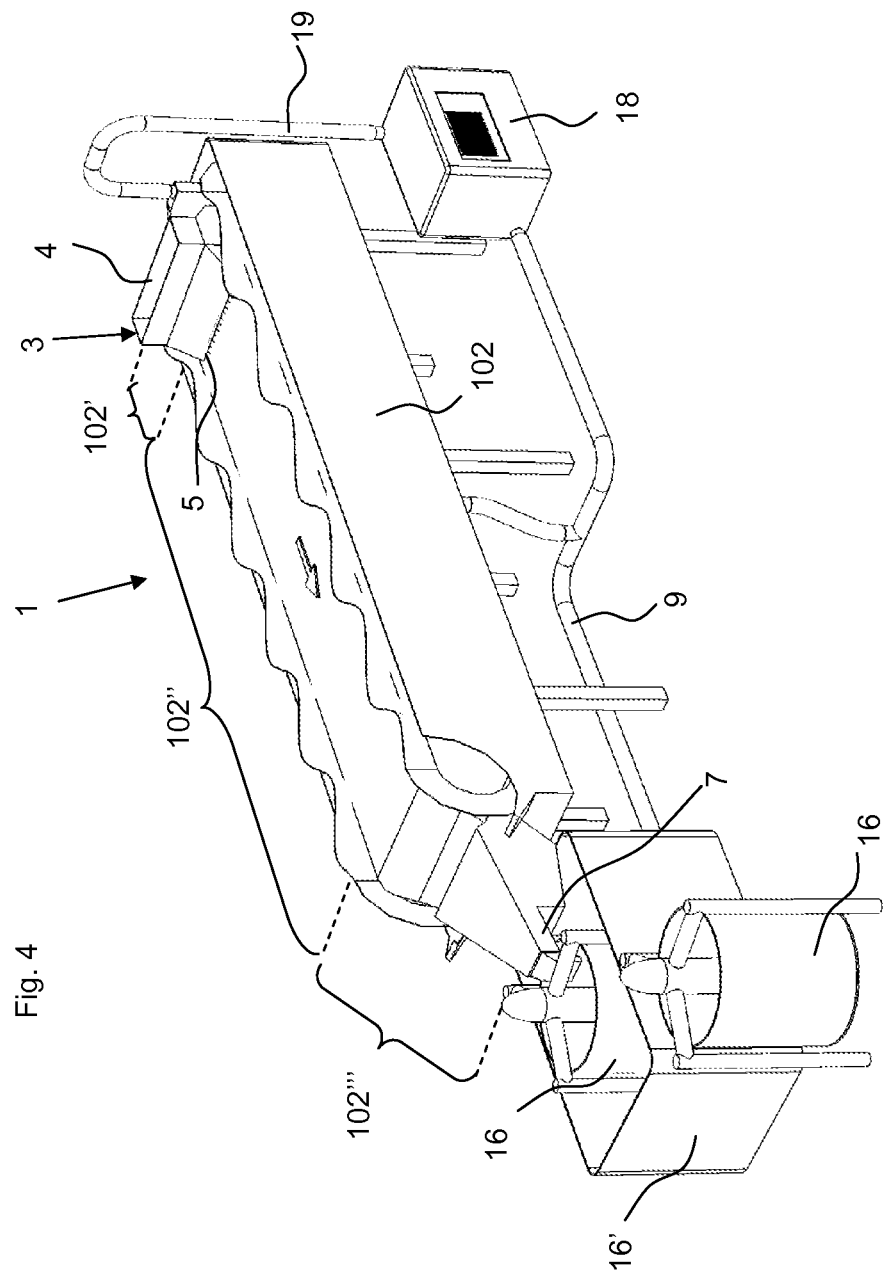
Figure 5A:
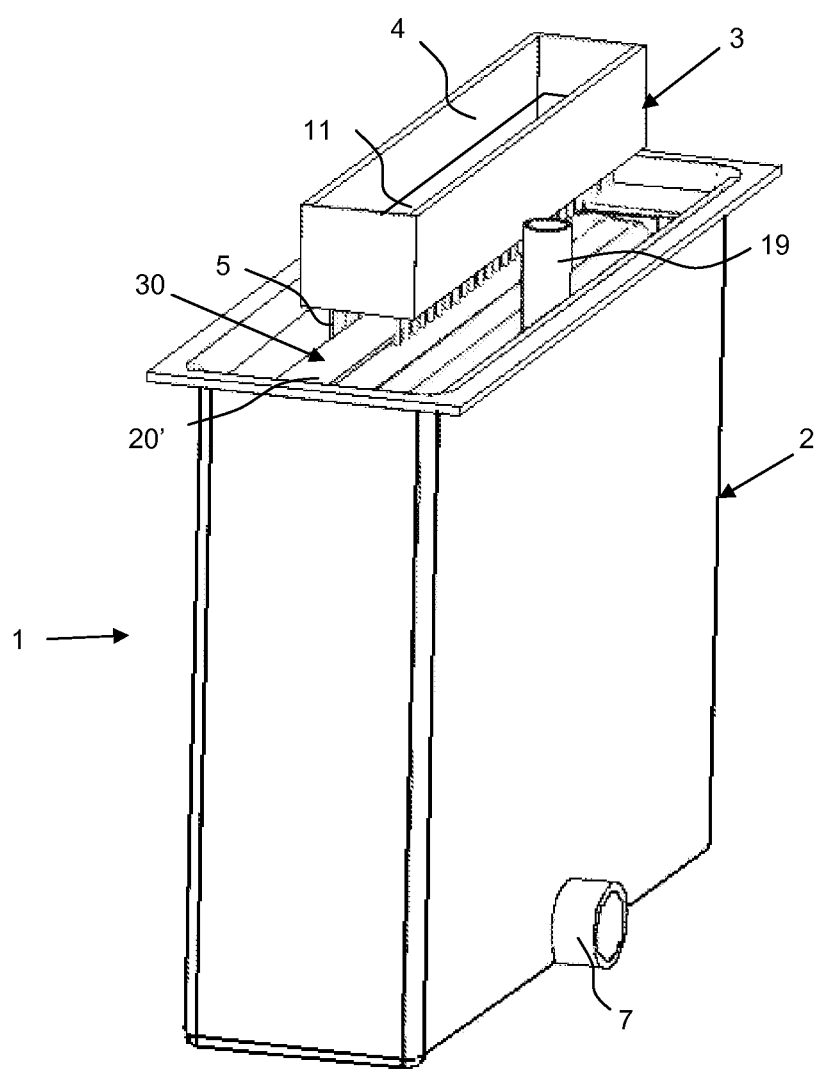
Figure 5B:
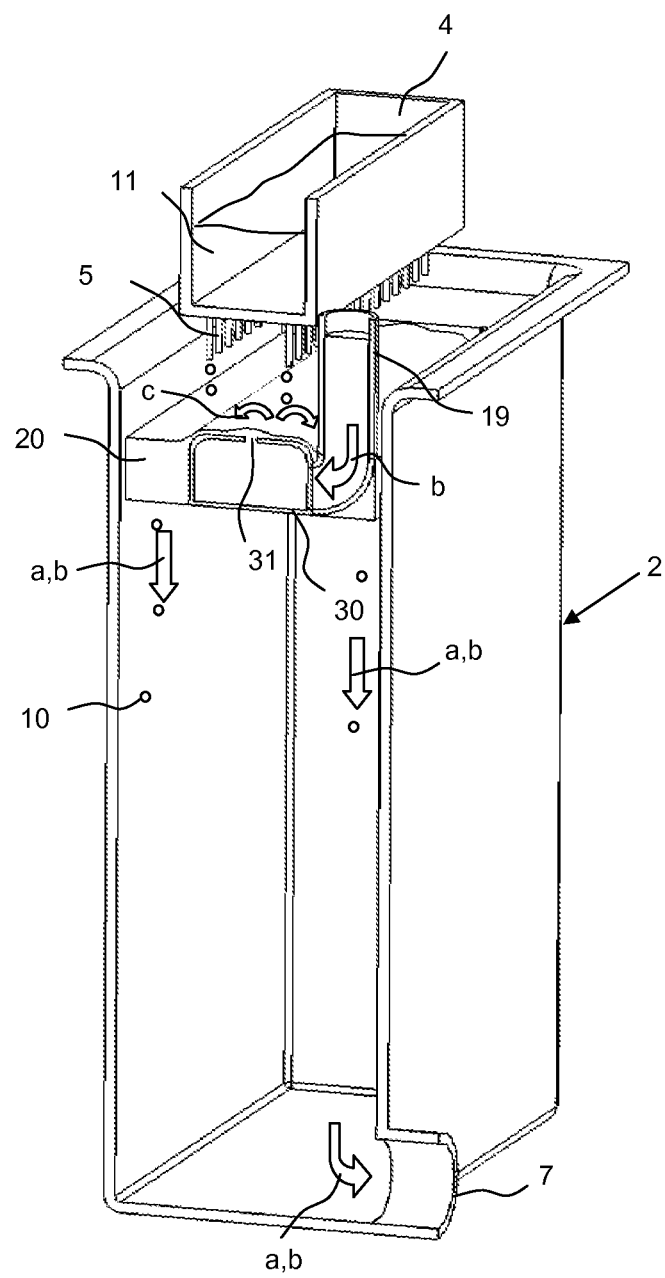
Figure 5C:
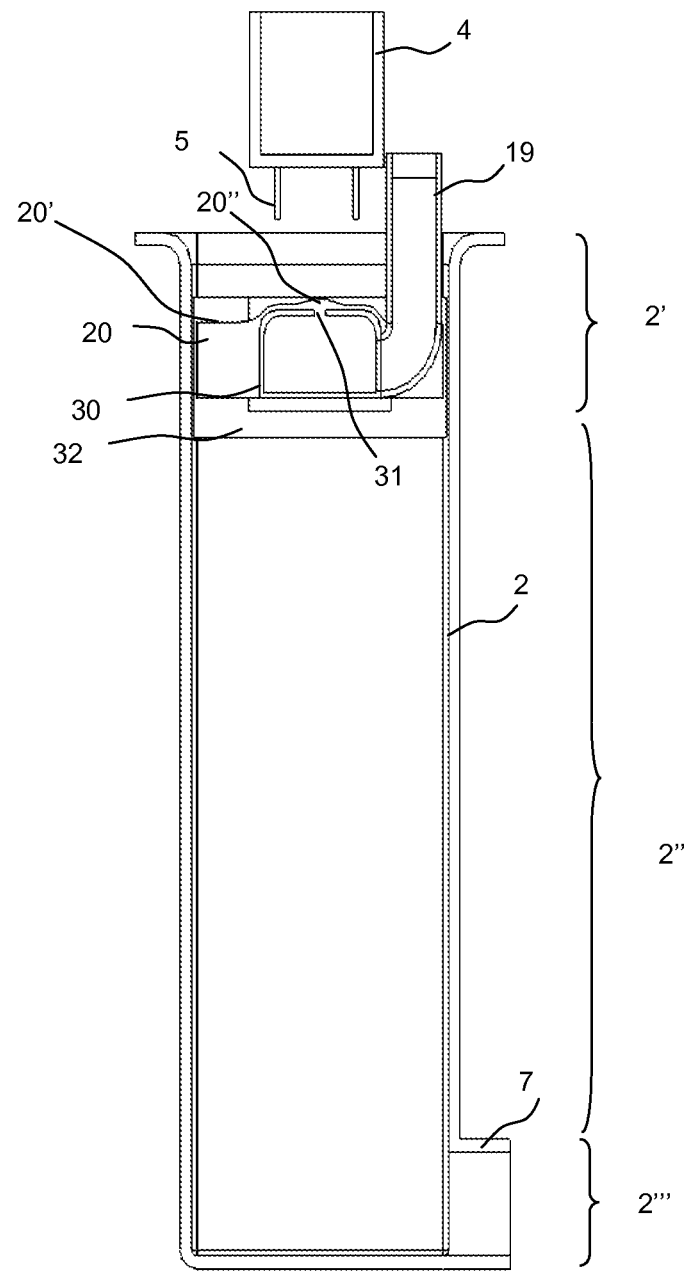
Figure 5D:
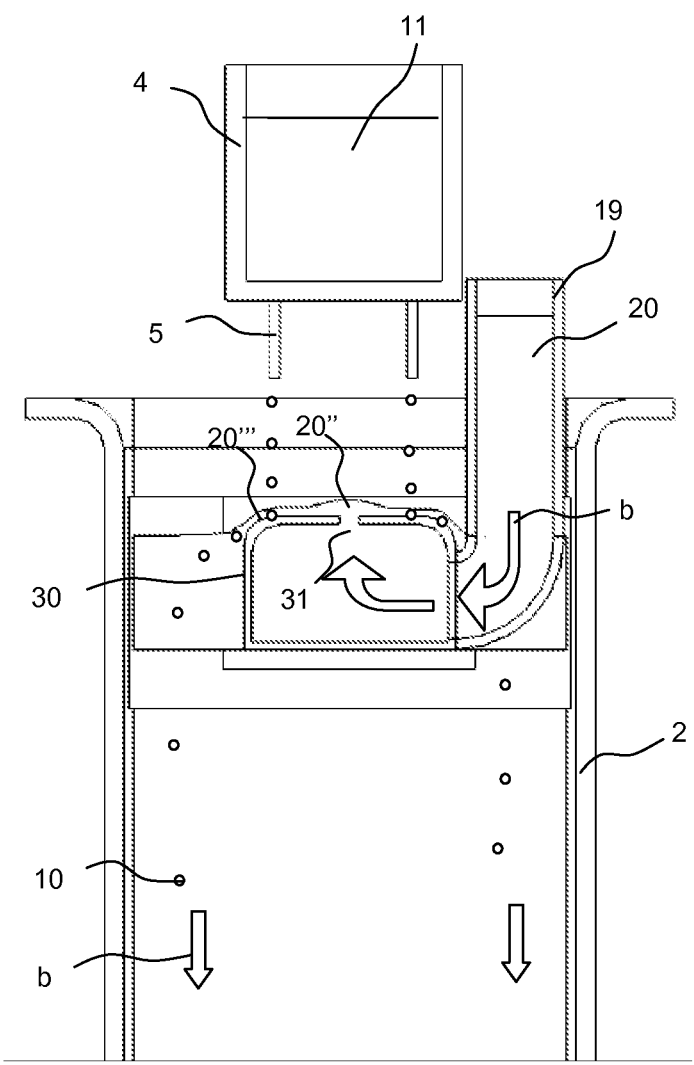
Figure 5E:
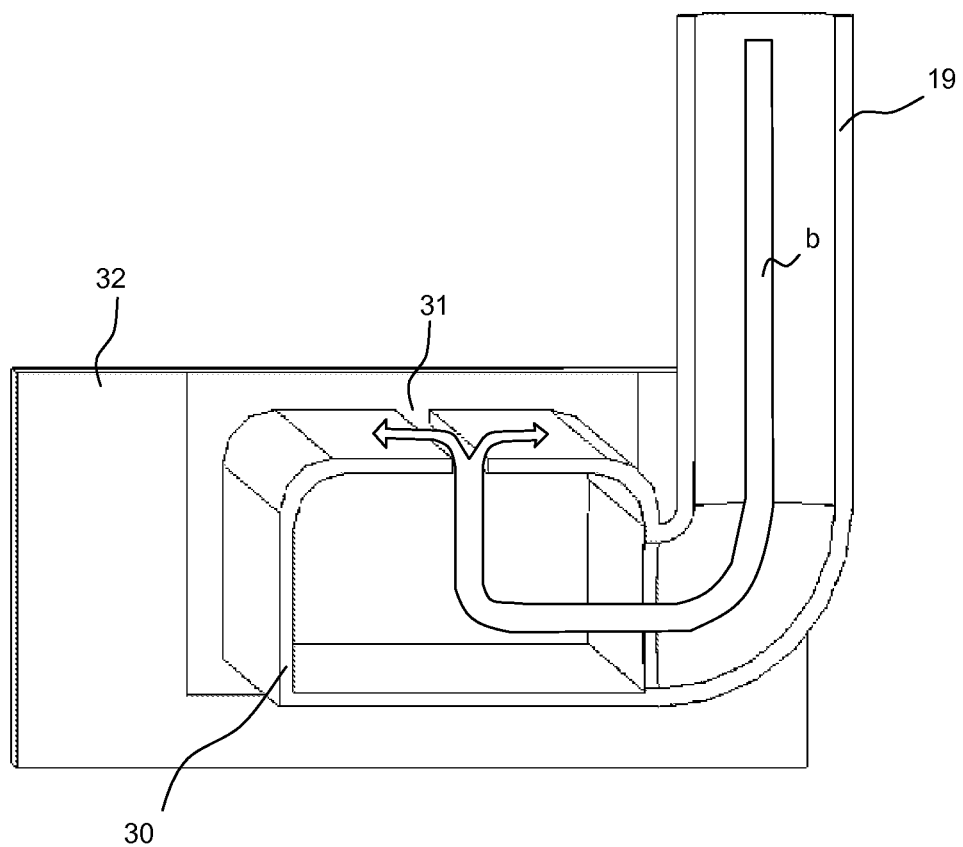
Figure 5F:
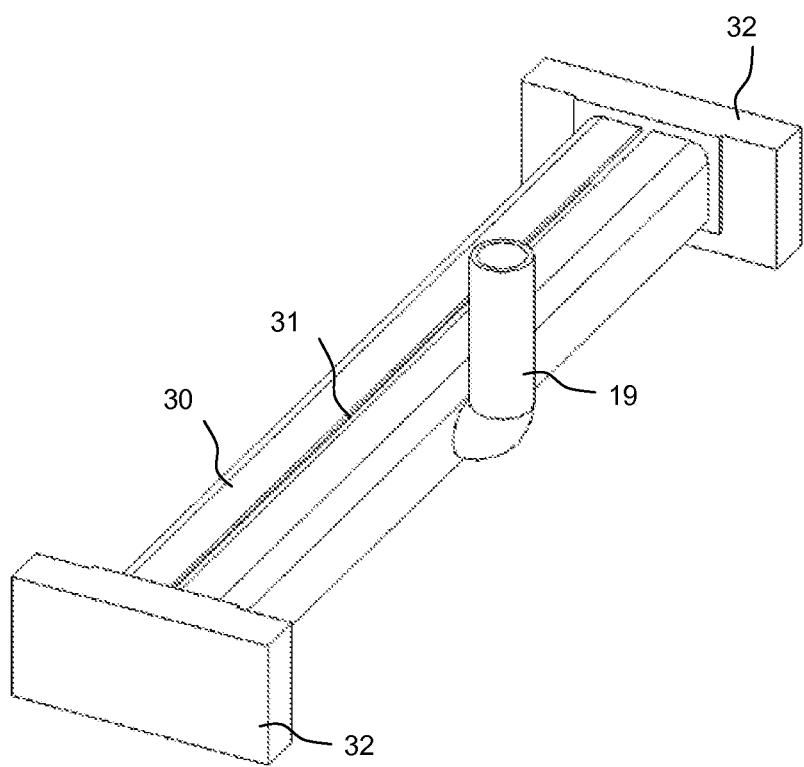

FIG. 1c schematically shows a detail of the pipetting device, which is situated in the receiving area of the flow reactor from FIG. 1a, FIG. 2a shows a perspective side view of a device for producing ice beads according to the invention, which is implemented as a flow channel, FIG. 2b shows the flow behavior of the fluids of the device from FIG. 2a, FIG. 3 shows a perspective top view of a device, which is implemented as a ring flow channel, for the generation of ice beads according to the invention, FIG. 4 shows a device according to the invention, which is implemented as a band reactor, in a schematic side view, FIG. 5a shows a perspective front view of a further embodiment of a device implemented as a vertical flow reactor, FIG. 5b a perspective longitudinal section of the flow reactor from FIG. 5a, FIG. 5c shows a frontal longitudinal section of the flow reactor from FIG. 5a, FIG. 5d shows a frontal longitudinal section from FIG. 5a of the receiving section having the distributor device, FIG. 5e shows a perspective longitudinal section of the distributor device from FIG. 5a, FIG. 5f shows a perspective top view of the distributor device from FIG. 5a.

It is to be noted that the term "reactor" is to be understood hereafter as a vessel, in which a reaction such as the change of a phase of a liquid occurs. Suitable reactors comprise a flow reactor implemented as a channel, one of the embodiments being described as an inclined channel or "slide", as a conveyor belt, or as a rotating ring reactor, in a manner of speaking as a "carousel". A further suitable reactor is a vertical flow tube.

The aqueous active ingredient mixture is understood as either an aqueous liquid containing active ingredient, which contains a substance acting as an insecticide, herbicide, fungicide, as a fertilizer, as a soil or water improvement agent dissolved in water. Active ingredients of special interest in the present case are insecticides which are contained in *Bacillus Thuringiensis lsraelensis* (BTI) or *Bacillus Sphaericus* (BS endotoxin); or it means a food such as a fruit juice. It is fundamentally advantageous if the liquid to be frozen is water or water having materials dissolved therein or emulsified either in or materials which float in water, which do not substantially change the freezing properties of the water, so that the hydrophobic liquid which is used as the freezing medium for the aqueous active ingredient mixture can have a temperature which must be as little as possible below 0° C. in order to provide the desired ice bead product.

To achieve an improved production rate, it can prove to be suitable to execute the method at a lower temperature of the hydrophobic medium; a temperature of approximately −12° C. has proven itself for the described aqueous active ingredient mixtures and an ice bead size of approximately 3.5 mm (average), which is advantageous for scattering the beads from the air. Depending on the droplet size, which determines the bead size, the composition of the liquid to be frozen, or the desired speed of the freezing procedure, significantly lower temperatures may be necessary.

The hydrophobic liquid used in the method according to the invention must always have a viscosity which allows the liquid to be frozen to assume the spherical shape. Furthermore, it is advantageous if the liquid is simple and cost-effective to provide. The hydrophobic liquid can be a petroleum fraction, for example, kerosene and petroleum, also motor oil or hydraulic oil, which has a low viscosity even at very low temperatures.

Some vegetable oils are also suitable, which may also be dispensed in nature because they are non-toxic, or which are even suitable for consumption. It is to be noted that oils which are already viscous or even hardened at room temperature or lower-lying temperatures, such as palm oil, are unsuitable, while in contrast false flax oil and flax oil have been found to be particularly suitable vegetable oils. Rape seed oil is also suitable, but only to a limited extent, however, since it can only be used in a suitable way in a mixture with the above-mentioned oils because of its viscosity.

The devices according to the invention are fundamentally suitable for producing ice beads containing active ingredient. For this purpose, it is necessary for an active ingredient such as BTI to be dissolved, mixed, or emulsified, preferably in water, to achieve a product group of the nonfood field, so that the active ingredient is frozen together with the carrier liquid into beads or spherical ice particles. Such ice beads, which are frozen through homogeneously and have a desired diameter, one batch of produced ice beads overall being homogeneous with respect to the ice bead diameter, are suitable for the purpose of being dispensed onto the Earth's surface by means of aircraft such as helicopters, for example, which have suitable dispensing devices. The dispensing of the insecticide BTI, dissolved in water and frozen into ice beads, onto aqueous surfaces such as specific areas of the islands of the Rhine, in order to destroy mosquito larvae at a correspondingly suitable time, is considered here, for example.

A food product group can contain a fruit juice as the aqueous mixture, or a fruit juice mixture, a fruit syrup or nectar mixture, or a basic component suitable for consumption as ice cream, which then has a film thereof through the production by means of the method according to the invention and the incomplete separation of the hydrophobic liquid; this can be utilized in that a valuable food oil is used in the production process and the residue adhering to the product serves as a nutritional supplement, for example, because of included omega-3 fatty acids.

Such ice beads can be produced having desired sizes as homogeneously shaped and frozen-through particles by means of a device which comprises a pipetting device, in the present case a pipetting device being understood not as a burette having a single pipette, but rather a vessel which can be integrally manufactured and has a plurality of tapering outlet tubes in a vessel wall, or which was produced from a vessel, on whose wall a plurality of passage openings are provided, into which the cannulas have been tightly fitted. It is fundamentally conceivable to dispense with cannulas and only provide holes of at most 1.0 mm diameter in the base of the pipetting device.

If a liquid, such as the aqueous active ingredient mixture in the present case, from which the ice beads are to be produced, is poured into the vessel, droplets leave the vessel via a plurality of cannula tips of the cannula. The wall can be both a side wall and also the floor of the vessel; this depends on how the pipetting device is situated in relation to a further vessel. This further vessel is a receiving vessel for a hydrophobic liquid. This hydrophobic liquid is pre-cooled by means of a cooling device, it being cooled down to a temperature in the range of 0° C. to −30° C., advantageously −5° C. to −30° C., particularly advantageously to a temperature in the range of −12° C. to −18° C.

The pipetting device is now situated over the receiving vessel or on the receiving vessel for the hydrophobic liquid such that the cannula tips protruding from the pipetting vessel point in the direction of the receiving vessel for the hydrophobic liquid so that they are either immersed up to 0.5 cm into the liquid or are situated up to 10 cm above the liquid surface, so that the droplets cover a distance of approximately 10 cm, advantageously not more than 5 cm, in the air before they are incident on the surface of the hydrophobic liquid. The cooling device is connected to the receiving vessel for the hydrophobic liquid via a supply device in consideration of the shortest possible distance.

The overall process is a continuous procedure in all plant variants, which is always operated using a pump, which typically runs continuously during the process control. There is no direct connection between pump and reactor, rather the oil runs continuously into an open catch container, from which the oil from the centrifuge also runs, during the separation of the ice. The pump suctions the oil heated by the process out of this container and pumps it through the heat exchanger of the refrigerator back into the reactor.

The location at which the hydrophobic liquid is supplied into the receiving vessel is also referred to hereafter as the receiving section. Corresponding to the receiving section, to which the hydrophobic liquid is supplied, there is also an outlet section; this is to be understood as the part of the receiving vessel at which a retrieval device for the hydrophobic liquid and the ice bead product, which is carried along by the hydrophobic liquid, is provided. A simple retrieval device can comprise an opening, on which a nozzle or hose part extends for transferring the product together with the hydrophobic liquid into further processing devices located downstream; however, it is also conceivable that a suction pump is provided, using which the ice bead product guided by hydrophobic liquid is suctioned off, a simple device similar to a scoop is also conceivable. A flow section is located between the receiving section and the outlet section.

When the aqueous active ingredient mixture leaves the pipetting device via the cannula tips of the cannulas in droplet form and, either immediately or after covering a falling distance in the air, penetrates into the hydrophobic, ice cold liquid and therefore covers a fluid path, the droplets begin to freeze with the penetration into the hydrophobic liquid and the procedure of freezing through is completed upon covering a flow distance in the hydrophobic liquid.

The usage of a vertical upright flow reactor is particularly favorable, since it may be skillfully connected to the pipetting device. In order to situate the pipetting device in a suitable way on the receiving vessel implemented as the flow reactor, the vertically situated flow reactor, which can have a circular or polygonal cross-section, can have a greater opening cross-section on its upper end than the pipe section in a middle area. The transition between the pipe sections deviating from one another is implemented by a shoulder, which runs horizontally or can have an inclination of up to 15°. The pipetting device can be situated in this widened opening cross-section so that the cannula tips pointing out of the pipetting device, which can by the way be situated horizontally in multiple rows peripherally on the vessel wall of the pipetting vessel, are spaced apart by at least 5 mm, preferably up to 5 cm, from the wall of the flow reactor. The vessel can be supported on the shoulder of the flow reactor.

Furthermore, it is provided that, in the gap which results between the vertical wall of the pipetting vessel and the vertical flow reactor wall, a separation device such as a separation ring, which can be supported at points on the shoulder, is situated equidistant to the flow reactor wall and peripherally to the pipetting vessel, an air gap being provided between the cannula tips and the side of the separation device facing toward the cannula tips, a space for decanting the cold fluid remaining between the separation device and the flow reactor wall, in contrast. This cold fluid flows under an edge of the separation wall supported on the shoulder, which leaves at least one gap open there. The height of this separation wall is at least sufficiently high that it extends beyond the highest opening of a cannula tip. The droplets impinging on the hydrophobic fluid stream, which can be an oil stream, initially tend to sink, but will have a lighter specific density upon the beginning of the freezing procedure. No matter whether they would float or rise in the medium depending on the temperature and therefore the density of the hydrophobic liquid, they are drawn deeper into the vertical reactor with the oil stream, where they freeze further. They leave the flow reactor, which can advantageously taper in a funnel shape at its lower end, through an outlet nozzle. A hose or a tube can be connected to this nozzle, using which the stream containing the ice beads can be supplied to further treatment. The dwell time of the ice beads in the hydrophobic medium can be lengthened using the length of the hose or tube, in order to achieve better freezing through, for example.

These devices can advantageously be implemented using cylindrical elements, so that the separation wall is implemented situated as a ring around the pipetting vessel. In this case, the pipette tips of the pipetting vessel, which is also cylindrical, point radially in the direction of the partition ring.

It is to be noted that in the vertical reactor, as in other suitable reactor types, shear forces also occur on the inner wall of the tube and also on the ring-shaped concentrically situated droplet dispensing surface. These shear forces have a disadvantageous effect on the form of the ice beads: With respect to the shear forces on the tube inner wall, the droplets apparently do not display any tendency upon sinking to drift sufficiently far outward that they would be impaired here. During the droplet dispensing, the droplets behave so that they deform due to the shear forces at the base of the dispensing surface and during the deflection from the horizontal into the vertical movement direction. As soon as they are then entrained by the through flow and sink in the vertical area of the reactor, they assume the spherical shape therein.

Furthermore, it is fundamentally important that the temperature of the hydrophobic liquid is selected suitably: If the medium is too cold, the freezing procedure begins immediately upon incidence of the droplets on the medium, and the deformation is preserved. The temperature range from $-12°$ C. to $-14°$ C. has proven to be the ideal temperature if vegetable oil is used.

Furthermore, it is favorable if an overflow line is attached on the vertical outer wall of the reactor in the area of the dispensing of the hydrophobic liquid and the droplets, which leads to the intake vessel, from which the pump removes the oil and supplies it to the heat exchanger. This relieves one from the necessity of having to set a very precise balance between the dispensing quantity and the drainage quantity.

Through this design of the device, it is now possible that the oil which is cooled to the desired temperature is decanted into the gap between flow reactor and separation wall, so that it flows under the gap of the separation wall, or through the ring gap, respectively, and over the shoulder in the direction of the tapered tube section. An air space remains between the openings of the cannula tips and the surface of the hydrophobic liquid, so that the droplets may fall down into the gap which forms between the pipetting vessel wall and the separation wall, and may be incident on the hydrophobic liquid surface, the immediately freezing water-active ingredient mixture droplets being carried along by the flowing hydrophobic liquid and guided along the vertical flow pathway of the flow reactor.

During the passage through this fluid path, homogeneous freezing through of the droplets occurs, so that they are shaped perfectly spherically and frozen through when they arrive at the outlet section of the flow reactor.

A suitable embodiment of the flow reactor provides that it is tapered in a funnel shape on its outlet section and the funnel opens into an outlet nozzle. This funnel-shaped taper is possible both in cylindrical flow reactors and also in flow reactors which have a polygonal cross-section.

Furthermore, to reduce the flow velocity of the hydrophobic liquid, the outlet cross-section of the outlet opening can be selected as correspondingly small, and it is possible to lead the nozzle, which adjoins the outlet opening, horizontally or curved or buckled in another way.

A comparable result with respect to achieving the desired ice bead products may be achieved using a receiving vessel which is designed as a flow channel, the flow channel being able to have an inclination along its main extension direction. Fundamentally, the channel can be implemented as a simple half tube, simple box-shaped embodiments also being possible. A pump is always situated on the device, and the oil already runs due to the continuous charging, even if the slide is horizontally mounted. The relative velocity of oil to cannulas has proven to be ideal at 5 cm/s, an inclination is then not absolutely necessary.

In the case of the conveyor belt, the belt represents the reactor vessel through its co-rotating side walls (corrugated belt). Belt velocity and dispensing quantity of oil are balanced so that the film thickness remains equal, and the oil does not move in relation to the belt after the dispensing at the head end.

In this design of the receiving vessel, the pipetting device can be designed as a box, the cannulas being situated in a base side of the box, which is at least partially open on top and is connected to corresponding storage vessels, so that the pipette tips are perpendicular to the liquid surface and are either immersed therein or are situated approximately 3 cm to 10 cm, advantageously 5 cm, above the liquid surface.

The cannulas can also be designed so that the cannula tips are designed as slightly buckled, so that the line which forms between the buckle of the cannula and the cannula tip opening forms an angle of 0 to 30°, advantageously approximately 15°, to the liquid surface. The droplets guided out of the pipetting vessel via the cannulas and exiting from the cannula tips now fall a few centimeters through the air and are then incident on the stream of the hydrophobic liquid. They are entrained thereon, until they are removed at the end of the flow channel via a removal device, which is essentially also connected to the drainage of a corresponding component of hydrophobic liquid.

Since the flow channel can have both a linear form and also a ring form, the ring form not being capable of being inclined in relation to the horizontal and thus requiring the arrangement of a pumping device to move the hydrophobic liquid or a device to move the flow channel or the pipetting device, the retrieval device can also be designed differently depending on the design of the flow channel: It can thus prove to be sufficient in the case of the removal device, in particular with the linear, inclined form of the flow channel, to solely provide an outflow nozzle at the end of the channel, via which the hydrophobic liquid together with the entrained ice bead product is let out. However, it can also be suitable, in particular in the ring-shaped embodiment, to scoop the ice beads out of the hydrophobic liquid or to suction them off by means of a corresponding suction device.

In general, the inclined channel implemented as a "slide" is permitted, in which a hydrophobic medium transferred from the cold flows through a horizontally oriented channel, is fed at the receiving section or head end, and leaves the reactor together with the frozen ice beads at the outlet section or base end. It is to be noted that the liquid to be frozen is added close to the head end by means of the pipetting device, because the flow distance is necessary so that the freezing process can occur continuously, and so that the droplets remain separate during the freezing procedure.

With increasing dripping frequency, the flow velocity is to be increased accordingly, in order to ensure the separation of the freezing droplets. The flow velocity and the thickness of the hydrophobic medium in the channel can be controlled by the feding quantity of the medium per unit of time, by damming, by inclination of the channel (positive and negative), and by the combination of these methods. The required dwell time of the droplets in the medium which transfers cold must be made possible by the corresponding length of the channel.

It is to be noted that a heat introduction into the hydrophobic medium due to the passage through the heat exchanger must be compensated for.

Because of the laminar flow, it is to be ensured that a droplet which is not yet enclosed by a stabilizing ice envelope does not reach areas of the channel where the shear forces resulting from the differences in the flow velocity are greater than the forces which cause the sphere formation, since otherwise deformation occurs during the freezing procedure. These areas are to be found close to the channel base and the channel walls, of course. The deformation can therefore be prevented in that the outlet end of the cannula is immersed a few millimeters deep into the hydrophobic medium and in that the cannulas at the edge are spaced apart at least 3 cm from the flow channel wall; furthermore, a thickness of the transfer medium in the channel is to be selected which ensures that the droplets do not sink into the deep area or even touch the channel floor, where the shear forces result in deformations, before they have a stabilizing ice envelope.

If vegetable oil is used as the transfer medium, it has a favorable effect for the further route of the ice beads, which freeze through along the flow channel, that their specific gravity decreases due to the freezing, and the ice beads remain floating, or even float on top, depending on the temperature of the vegetable oil. If low-viscosity mineral oils or synthetic oils are taken as the hydrophobic medium, a significantly lower temperature of the oil must be selected because of the high sinking velocity of the droplets in these oils than must be selected for vegetable oils with otherwise identical processing parameters; alternatively, a greater thickness of the oil stream, or a combination of both may be selected.

The ice slide is therefore a device variant which is suitable in particular for the use of vegetable oils as the hydrophobic medium; the advantage of the slide results from its simple construction and the simple process control.

One advantage of the vertical reactor is that no interfering shear forces occur therein, and a large exposed surface of the hydrophobic medium is not provided, which must be insulated well, if the production is not performed in cold storage, in order to also take into consideration, in addition to the energetic aspects, the fact that condensation of ambient humidity and therefore enrichment of water can occur on the surface of the hydrophobic medium.

All embodiments of the reactors share the feature, however, that they can be coupled downstream from the retrieval device to a separation device, in order to separate the ice bead product from the hydrophobic liquid. Such a separation device can be a centrifuge or also a sieve.

The separated liquid can particularly advantageously be cooled again, in that it is transferred directly from the separation vessel to the cooling device, from there it can be returned into the method, in that it is supplied again by means of a corresponding hose or line connection on the receiving section of the corresponding receiving vessel.

If a ring-shaped or a linear flow channel is selected, it has proven to be advantageous if a damming device is provided in the stream of the hydrophobic liquid, the damming device being situated in the range of approximately two-thirds to one-half of the flow distance of the hydrophobic liquid provided by the flow channel. The damming device can be a simple plate, whose shape is adapted to the cross-sectional contour of the channel. The plate is fastened by means of an axis on the side walls of the channel and rotates in the flow direction. The flowing stream of hydrophobic liquid forces the droplets coming to the plate, which are in the process of freezing, to be submerged due to this plate. Because of a damming wave on the lower edge of the plate, which is generated by the hydrodynamic effects, the droplets do not touch the plate directly, but rather are forced downward by the damming wave, so that freezing in spherical form is not obstructed.

The droplets are therefore forced into a lower-lying layer of the hydrophobic liquid and can freeze through in a suitable way without being deformed as they cover the remaining flow route.

In the ice carousel, which can alternatively also be used, the entire vessel having the hydrophobic medium resting therein moves through under the pipetting device, which is fastened outside the vessel, e.g., to a tripod, the dispensing device for the hydrophobic medium, which is situated similarly, and the product removal device. This mode of operation applies for the carousel, which rotates around the central axis, and also for the conveyor belt, which represents a moving channel with its corrugated edge, in which the hydrophobic medium rests until leaving the belt at its outlet end/foot end. The advantage of these two variants is that no shear forces occur here, since the hydrophobic medium does not move in the channel.

At the outlet of the respective reactor, from which the oil/ice mixture exits continuously, the ice beads are advantageously separated as extensively as possible from the oil by dripping off, before they are supplied to the centrifuge. In order to incorporate this procedure in the continuity of the overall process, the oil/ice mixture exiting from the reactor drain can be conducted into an inclined tube, which can be interrupted by many slots and rotates slowly around its longitudinal axis. A large part of the oil drains through the slots and runs into the catch container positioned below the tube, from which the pump pumps the oil back to the reactor via the heat exchanger. The circuit is thus closed. After passing through the drip tube, the ice beads reach the centrifuge. The oil spun off here also flows into the catch container. After being spun off, a small quantity of oil remains adhering to the ice. Approximately 10 g of oil remain on 1 kg of ice beads. The quantity of oil thus withdrawn from the plant is continuously supplemented from a storage container.

In contrast to ice beads produced conventionally by means of nitrogen, the product according to the invention displays a homogeneous and spherical structure, all spheres which would exit the cannulas having equal internal diameter have essentially an equal diameter, which makes the product particularly suitable for dispensing by means of air transport means over land or water, since the scattering effect can thus be optimized.

The selection of the outlet opening of the cannula tips determines the size of the sphere diameters; known cannulas are typically classified via their external diameters and in particular cannulas having external diameters of 1 mm to 8 mm come into consideration for the present method, an external diameter of 1.2 mm having been proven to be ideal.

Figure 1B:
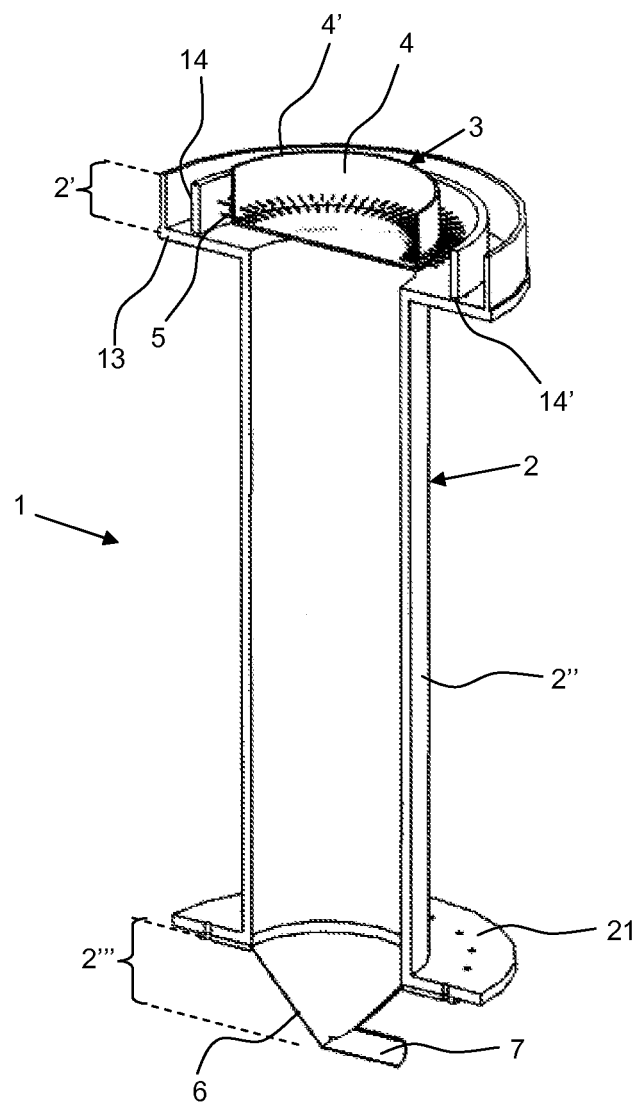

FIGS. 1a, 1b, 2a, 3, 4, and 5a show embodiments of the devices according to the invention. FIG. 1a shows the longitudinal section of a vertically situated flow reactor 2, which is tapered in its middle section 2" and provides a flow section 2"'. The flow reactor 2 widens above its flow section 2" via a peripheral shoulder 13 into a receiving section 2', at which the dispensing of the hydrophobic, ice cold liquid occurs. The receiving section 2' of the cylindrically designed flow reactor 2 is separated from the centrally situated pipetting device 3 by a separation ring 14. The separation ring 14 is seated at points on the shoulder 13 and is spaced apart by a non-continuous ring gap 14' from the shoulder 13. This arrangement is also shown in FIG. 1b. The pipetting device 3, which comprises the vessel 4, in whose wall 4' two peripheral rows of cannulas 5, which are situated adjacent to one another, are situated, is also situated above the shoulder 13 and is fixed spaced apart therefrom (not shown in the figure).

Fundamentally, the pipetting device can also be held in the position shown by means of a mount and therefore does not have to be supported by the shoulder 13. The flow reactor 2 tapers at its outlet end 2"' into the funnel-shaped collector 6, which opens into an outlet nozzle 7. The flow reactor can be positioned and held by means of a flange 21.

As is clear from FIG. 1c, which shows detail A marked by dashed lines in FIG. 1a, the vessel 4 of the pipetting device 3 is positioned on the area 2' of the flow reactor 2 so that an air gap 15' remains between a base of the vessel 4 and the surface 20' of a flowing hydrophobic liquid 20. The ice-cold hydrophobic liquid 20 is decanted, as shown by arrow b, into a ring gap 15 between the separation ring 14 and the outer reactor wall of the receiving section 2". The liquid flows through the ring gap 14', as further indicated by arrow b, via the shoulder 13 into the tapered section 2" of the flow reactor. The liquid 11, which is decanted into the pipetting device 3, exits via the cannula tips of the cannulas 5 and falls down drop-by-drop in the air gap 15' between the outer vessel wall and the separation ring 14 and impinges on the surface 20' of the hydrophobic liquid after approximately 5 cm falling height.

The freezing of the aqueous active ingredient mixture 11 into ice beads 10, which are entrained by the flowing hydrophobic liquid 20 and, following the flow pathway a, b, are drawn deeper, where they can collect in the collector 6, as shown in FIGS. 1a and 1b, before they are let out via the outlet nozzle 7.

The embodiment of the device 1 for producing the ice beads shown in FIG. 5a also has a vertical flow section. This device 1 is similar to a cuboid standing on edge, over whose open upper side the pipetting device 3 is situated. Corresponding to the rectangular surface of the flow reactor 2, the vessel 4, which contains the aqueous active ingredient mixture 11, is also implemented having a rectangular cross-section, whose longitudinal extension essentially corresponds to the longitudinal extension of the rectangular surface of the flow reactor 2, while the width of the vessel 4 in the embodiment shown is less than the width of the flow reactor. Two rows of cannulas 5 situated in parallel in the longitudinal direction extend from the base of the vessel 4, whose outlet ends are between 3 and 10 cm above the surface 20' of the hydrophobic liquid, which is supplied by means of a distributor device 30, which is described in greater detail hereafter, to the flow reactor 2. The feeding of the distributor device 30 with the cold, hydrophobic liquid, in particular with oil, very particularly preferably with edible oil, is performed via the supply line 19, which easily finds space because of the lesser width of the pipetting device 3. An outlet nozzle 7 is situated at the lower end of the flow reactor 2 to remove the hydrophobic liquid having the finished ice bead product.

The arrangement of the distributor device 30 in the flow reactor 2 is illustrated in FIG. 5b. The distributor device 30 is formed by a hollow profile, on whose side pointing upward, in the direction of the pipetting device 3, a gap 31 extends, through which the hydrophobic liquid 20 is transferred into the flow reactor 2 (arrow c). The fluid path b of the hydrophobic liquid therefore runs from the supply line 19 through the hollow profile 30 and its exit 31, from which the fluid path divides on both sides, vertically downward through the flow reactor 2 to the outlet nozzle 7. The two cannula rows 5 of the pipetting device 3 are situated offset parallel to the exit gap 31, so that a pathway a, which half of the droplets made of active ingredient solution 11 follow in each case, runs starting from the source gap 31 to the right and left past the distributor device 30, corresponding to the fluid path b.

The "fluid berg" 20" formed by the source gap 31 is well visible in FIG. 5c. Through a floating arrangement of the distributor device 30 in the receiving section 2' of the flow reactor 2, the gradient shown of the fluid film formed on the hollow profile results on both sides of the gap 31: The surface 20' of the hydrophobic liquid runs originating from the "fluid berg" 20" on both sides over the rounded edges of the hollow profile 30 to the surface level, which is held in the reactor 20.

The floating arrangement of the distributor device 30 is implemented by a buoyant body 32 at each of the longitudinal ends of the hollow profile 30, which is more clearly visible in FIGS. 5e and 5f. During the passage of the correspondingly dimensioned flow section 2", the dripped-in active ingredient beads freeze, so that the removal can be performed in the outlet section 2''' through the nozzle 7. The receiving section of the reactor 2 having the supply of the cooled, hydrophobic liquid 20 and the dispensing of the droplets containing the active ingredient solution 11 is shown in greater detail in FIG. 5d. Droplets of the active ingredient solution 11 fall from the vessel 4 through the cannulas 5 on both sides of the exit gap 31 of the distributor device 30 onto the cooled hydrophobic fluid film 20''', and are transported away with the flow b of the hydrophobic liquid, which runs on both sides of the "fluid berg" on the distributor device 30, in the vertical flow section of the reactor 2. The freezing into the ice beads 10 occurs therein.

A longitudinal section in the area of the supply line 19 through the distributor device 30 shown in FIG. 5e, which is provided by a hollow profile slotted on top, once again illustrates the fluid pathway b, which the cooled, hydrophobic liquid takes through the exit gap 31. The floating arrangement of the distributor device 30 in the reactor is provided by the buoyancy of the buoyant bodies 32 (one of the buoyant bodies 32 is shown in FIG. 5e), which are fastened on the front sides of the hollow profile. The arrangement of two buoyant or floating bodies 32 on the two front sides of the hollow profile 30 can be inferred from FIG. 5f. The buoyant bodies 32 simultaneously form frontal termini, so that the liquid supplied through the supply line 19 can only exit through the exit gap 31. The supply line 19 is situated centrally on the hollow profile 31 here, to obtain a uniform liquid distribution.

The further processing after the removal of the ice beads carried along in the hydrophobic liquid, as well as the provision and recycling of the cooled, hydrophobic liquid, are performed fully analogously to the processing described hereafter of the embodiments of the device shown in FIGS. 2a, 3, and 4, which is designed in the present case in FIG. 2a as an elongated flow channel 102.

While a simple box-shaped trough is used as the flow channel 102 in FIG. 2a, a belt conveyor is shown in FIG. 4, which represents a device in which the hydrophobic medium rests, while the corrugated edge represents a moving channel.

FIG. 3 shows the flow channel in a ring-shaped embodiment, in which the entire vessel having the hydrophobic medium resting therein moves away from the pipetting device situated outside the vessel.

The embodiments of FIGS. 2a, 4, and 3 have a receiving section 102' of the receiving vessel, on which the hydrophobic fluid cooled from approximately −5° C. to approximately −30° C. is poured into the receiving vessel by means of a supply line 19 from corresponding cooling devices, see FIG. 3 and FIG. 4. The supply line is not shown in FIG. 2a. The pipetting device 3 is situated directly on the receiving section 102', which comprises a box-shaped vessel 4 in the present case, on whose base side, which is also understood as a wall in the present case, a plurality of cannulas 5 situated in rows extends. The cannulas 5 are fastened at an angle of inclination to the surface of the hydrophobic liquid.

The principle shown in the devices of FIGS. 2a, 4, and 3, on which the method of the present invention is based, is illustrated in a simple way in FIG. 2b: The pipetting device 3 has cannulas 5 situated on its base side and is filled using an aqueous active ingredient mixture 11. If excess aqueous active ingredient mixture 11 has been placed in the vessel 4, the excess can drain out via the drain nozzle 19'. The aqueous active ingredient mixture is dispensed in droplets 11' and falls on the surface 20' of the hydrophobic liquid (not shown in greater detail here). The droplets, which begin to freeze immediately upon touching the surface 20', change their phase and gradually form ice beads 10, which are guided with the stream, see arrow b.

FIG. 2b additionally illustrates the principle of the damming plate 17, which, as shown in FIG. 2a, is fastened along its longitudinal axis A-A by a rotational axis 17' on the side walls of the flow channel 102 so that it protrudes into the hydrophobic liquid. The surface 20' is lowered by the rotating damming plate, in that the liquid is pressed below the damming plate 17. The ice beads 10, which are not yet completely frozen through, are forced deeper and below the surface 20' of the hydrophobic liquid by the resulting damming wave, so that they freeze further homogeneously.

As shown in FIGS. 2a and 4, the ice bead product contained in the hydrophobic liquid can be removed through the outlet nozzle 7 from the flow channel 102.

FIG. 4 illustrates the further processing. The liquid stream containing ice beads is guided into a centrifuge 16, which serves as a separation device, and which is enclosed by a receiving vessel 16'. The separated hydrophobic liquid is returned by means of a supply line 15 directly into the cooling device 18, where it is placed by means of the supply line 19 on the receiving section 2' in the receiving vessel after further, and/or renewed cooling to the desired temperature. After the first centrifuging procedure, post-separation can be performed in a second centrifuge 16 if necessary.

Finally, FIG. 3 shows the ring-shaped flow channel 102, on whose receiving section 2' a device for applying ice-cold hydrophobic liquid to the receiving vessel, the circular trough here, is also located. The liquid is brought to the desired temperature in the cooling device 18 and transferred via the supply line 19 into the receiving section. A pipetting device 3, which is also designed as box-shaped, and which is open on top, as shown, is situated immediately downstream from the outlet nozzle, which adjoins the supply line 19. The ring-shaped flow channel is moved while the hydrophobic medium rests, until, after covering a circle of the device, the hydrophobic liquid having the ice beads resulting therein in the meantime passes the suction device and is suctioned off via the suction nozzle 8 and transferred directly into a centrifuging device 16 to separate the hydrophobic liquid.

It is thus possible that ice beads can be generated in large quantities using the devices according to the invention. The particles are frozen through homogeneously, are ideally spherical, and the ice beads produced in one batch have essentially equal diameters.

The product of this quality may be obtained because a relative velocity difference between hydrophobic liquid and the cannulas, which causes the aqueous active ingredient to drip out, is provided by setting either the liquid or the cannulas into motion, and therefore the freezing beads detach from the cannulas closely arrayed on one another and begin to sink under the liquid surface. As soon as the beads are harvested, in that they are scooped off or sieved off or separated in another way, it also proves to be advantageous in this case to use a hydrophobic liquid, such as a petroleum fraction or a vegetable oil, since these substances allow a separation of the ice beads from one another by centrifuging or spinning at temperatures below 0° C. The hydrophobic media can be handled harmlessly at the prevailing temperatures, even kerosene and petroleum. Furthermore, the method is particularly advantageous, since recycling of the hydrophobic medium is

LIST OF REFERENCE NUMERALS

| | |
|---|---|
| 1 | device for producing ice beads containing active ingredient |
| 2 | receiving vessel of flow reactor |
| 2', 2'', 2''' | receiving section, flow section, outlet section |
| 3 | pipetting device |
| 4, 4' | vessel for aqueous active ingredient mixture, vessel wall |
| 5 | cannulas/outlet tubes |
| 6 | funnel-shaped collector device |
| 7 | retrieval device |
| 8 | suction nozzle |
| 9 | return |
| 10 | ice beads |
| 11, 11' | aqueous active ingredient mixture, droplets |
| 13 | shoulder |
| 14, 14' | separation ring, ring gap |
| 15, 15' | decanting space, air gap |
| 16, 16' | centrifuge, receiving vessel |
| 17, 17' | damming plate, rotational axis |
| 18 | cooling device |
| 19 | supply line |
| 19' | drain nozzle |
| 20, 20' | hydrophobic liquid, surface |
| 21 | flange |
| 30 | distributor device |
| 31 | exit gap |
| 32 | buoyant body |
| 102 | receiving vessel of flow channel |
| 102', 102'', 102''' | receiving section, flow section, outlet section |
| a, b, c | fluid path of active ingredient mixture, hydrophobic liquid |

The invention claimed is:

1. A device for producing ice beads, wherein the device comprises:
   a cooling device for cooling a hydrophobic liquid to a temperature at or below −5° C.,
   a receiving vessel for containing the hydrophobic liquid,
   a pipetting device arranged on the receiving vessel, wherein the pipetting device has a vessel for containing an aqueous mixture and wherein a plurality of tapering outlet tubes are arranged in a wall of said vessel and extend into the receiving vessel, wherein each outlet tube comprises an outlet end arranged between 3 cm to 10 cm inclusive in distance from a surface of the hydrophobic liquid, and
   an apparatus for providing a relative velocity between the pipetting device and the hydrophobic liquid,
   wherein the aqueous mixture covers a fluid path from the vessel of the pipetting device via the outlet tubes into the hydrophobic liquid to form the ice beads.

2. The device according to claim 1, wherein the hydrophobic liquid is selected from the group consisting of (i) a petroleum fraction comprising kerosene and petroleum and (ii) a vegetable oil.

3. The device according to claim 1, wherein the cooling device provides a temperature of the hydrophobic liquid in a range from 0° C. to −30° C. inclusive.

4. The device according to claim 1, wherein the receiving vessel has
   a receiving section, which is connected to a supply device for the cooled liquid,
   a flow section, and
   an outlet section having a retrieval device.

5. The device according to claim 1, wherein the receiving vessel for the liquid is a flow reactor, which is oriented vertically with respect to a main extension direction.

6. The device according to claim 5, wherein a supply device for the cooled hydrophobic liquid is fluidically connected to a distributor device, which is arranged in the receiving section below the pipetting device,
   wherein the distributor device comprises a hollow profile having a slotted exit opening for the hydrophobic liquid, wherein the slotted exit opening opens upward, and wherein the plurality of tapering outlet tubes of the pipetting device extend vertically over a section of the hollow profile adjacent to the slotted exit opening.

7. The device according to claim 5, wherein the distributor device is arranged so it floats in the flow reactor.

8. The device according to claim 5, wherein the receiving section of the flow reactor opens via a shoulder into a flow section,
   wherein the pipetting device is arranged such that the tapering outlet tubes are arranged in the receiving section over the shoulder, wherein a separation ring is situated over the shoulder,
   wherein a ring gap between a lower edge of the separation ring and the shoulder and spaced apart from the pipetting device, a decanting space for inflowing liquid, and an air gap for aqueous mixture dripping out of the outlet tubes are provided, and
   wherein the aqueous mixture dripping out of the outlet tubes is incident on a stream of the hydrophobic liquid passing through the ring gap.

9. The device according to claim 1, wherein the receiving vessel for the liquid is a flow channel, which is oriented in relation to a horizontal having an inclination in the range of 0° to 30° inclusive with respect to a main extension direction, and is at least partially open on top.

10. The device according to claim 9, wherein the flow channel has a linear form or a ring form, and
    wherein the flow channel is operatively coupled to drive means, which provide a drive of the flow channel to execute a rotational movement around a central vertical rotational axis of the circular closed flow channel or a wavy conveyor movement in one longitudinal direction of the flow channel having linear form.

11. The device according to claim 9, wherein a damming device is situated transversely to the main extension direction of the flow channel in a fluid path of the liquid.

12. The device according to claim 2, wherein the hydrophobic liquid is selected from the group consisting of false flax oil, flax oil, or a mixture comprising (i) rapeseed oil and (ii) a petroleum fraction or vegetable oil.

13. A method for producing ice beads using a device according to claim 1, comprising the following steps
    providing a hydrophobic liquid which is cooled to a temperature of at least −5° C. by means of a cooling device,
    supplying the cooled hydrophobic liquid into a receiving vessel and supplying an aqueous mixture into a vessel of a pipetting device,
    drop-by-drop transfer of aqueous active ingredient mixture along a fluid path from the vessel via a plurality of outlet tubes into the hydrophobic liquid while providing a relative velocity between the hydrophobic liquid and the outlet tubes, wherein at least one of the two liquids is accelerated in relation to the other upon incidence of the aqueous active ingredient mixture on the liquid,
    freezing the aqueous mixture dripped into the cooled hydrophobic liquid and forming the ice beads therefrom.

14. The method according to claim 13, wherein the aqueous active ingredient mixture contains an active ingredient which is selected from the group consisting of insecticide, herbicide, fungicide, fertilizers, soil, and water improvement agents.

15. Ice beads producible by the method according to claim 13, wherein the ice beads have a homogeneous composition, a spherical form, and an essentially uniform diameter.

* * * * *